(12) United States Patent
Kishii

(10) Patent No.: US 7,346,276 B2
(45) Date of Patent: Mar. 18, 2008

(54) CAMERA

(75) Inventor: Daisuke Kishii, Osaka (JP)

(73) Assignee: Funai Electric Co., Ltd. (JP)

( * ) Notice: Subject to any disclaimer, the term of this patent is extended or adjusted under 35 U.S.C. 154(b) by 526 days.

(21) Appl. No.: 11/136,535

(22) Filed: May 25, 2005

(65) Prior Publication Data

US 2005/0276597 A1 Dec. 15, 2005

(30) Foreign Application Priority Data

Jun. 11, 2004 (JP) .............................. 2004-173389

(51) Int. Cl.
*G03B 17/00* (2006.01)
(52) U.S. Cl. ....................................... 396/299; 70/209
(58) Field of Classification Search ................ 396/297, 396/299; 70/207, 209
See application file for complete search history.

(56) References Cited

U.S. PATENT DOCUMENTS 3,956,762 A * 5/1976 Miyamoto ................. 396/297
3,956,763 A * 5/1976 Yamanaka ................. 396/297
3,964,082 A * 6/1976 Mita .......................... 396/299
4,173,404 A * 11/1979 Akasaka ..................... 396/299
4,405,222 A * 9/1983 Yamamoto et al. ......... 396/264

FOREIGN PATENT DOCUMENTS

JP 2003-075898 12/2003

* cited by examiner

*Primary Examiner*—W. B. Perkey
(74) *Attorney, Agent, or Firm*—Bacon & Thomas, PLLC

(57) ABSTRACT

The present invention provides a highly operable easy-to-use camera having a simple configuration with a few parts without losing a locking function. In a camera comprising: a rotary operation dial 6 to be operated rotationally; a locking function for locking the rotary operation dial 6 relative to a predetermined position; and a body case 2 to be fitted with the rotary operation dial 6, the rotary operation dial 6 is made of elastic body in an integrated manner, the rotary operation dial 6 comprising a lock lever part 63 having an operation lever 631 and a hook 632 which lie, respectively, outside and inside of the body case 2 relative to the rotary operation dial 6, the hook 632 being adapted to be fitted into a lock groove 23 formed inside the body case 2.

7 Claims, 3 Drawing Sheets

CAMERA

This application claims, under 35 USC 119, priority of Japanese Application No. 2004-173389 filed Jun. 11, 2004.

BACKGROUND OF THE INVENTION

1. Field of the Invention

The present invention relates to a camera having a locking function for locking a rotary operation dial to be operated rotationally, such as a mode setting dial, relative to a rotational predetermined position, and particularly aims at improving its operationality.

2. Description of the Prior Art

As is well known, a camera employs rotary operation dials such as a mode setting dial, shutter speed setting dial, and exposure compensation value setting dial so that the selection among a plurality of setting information can be performed at the same section. In such an arrangement, when a rotary operation dial is rotated by an accidental force to result in a switching of the photographing mode, there may be brought an unintended result, which can be a cause of trouble in a worse case.

In consideration of the above-described points, there has conventionally been known an arrangement that a push button is provided next to a rotary operation dial in the same plane, and that a lock spring is moved downward through the push button so that the engagement at the leading end of the lock spring, which is fitted into a groove formed in the lower face of the rotary operation dial, is released to be unlocked (refer to Japanese Patent Laid-Open Publication No. 2003-75898 for example).

However, the arrangement according to the foregoing patent document suffers from a problem in that a push button for lock release operation, a lock spring, a constitution as well as a fixing member for fixing the lock spring, etc. are required in addition to the rotary operation dial, resulting in an increase in the number of parts and also in a complex configuration, which reduces the workability substantially.

SUMMARY OF THE INVENTION

The present invention has been made to solve the above-described problem, and an object thereof is to provide a highly operable easy-to-use camera having a simple configuration with a few parts without losing a locking function.

In order to achieve the above-described object, the invention according to claim 1 provides a camera comprising: a rotary operation dial to be operated rotationally; a locking function for locking the rotary operation dial relative to a predetermined position; and a body case to be fitted with the rotary operation dial, wherein the rotary operation dial comprises: a dial body; a rotary operation portion positioned on the periphery of the dial body; a lock lever part formed by notching circumferential part of the dial body, the lock lever part including part of the rotary operation portion; and a connecting part for connecting the lock lever part and the dial body with each other, the rotary operation dial being made of elastic body in an integrated manner, and wherein an operation lever and a hook are formed in the lock lever part in such a manner as to lie, respectively, outside and inside of the body case, the hook being adapted to be fitted into a lock groove formed inside the body case, and also to be moved in a direction opposite to the operation lever around the connecting part in accordance with an operation of the operation lever.

The invention according to claim 2 provides a camera comprising: a rotary operation dial to be operated rotationally; a locking function for locking the rotary operation dial relative to a predetermined position; and a body case to be fitted with the rotary operation dial, wherein the rotary operation dial is made of elastic body in an integrated manner, the rotary operation dial comprising a lock lever part having an operation lever and a hook which lie, respectively, outside and inside of the body case relative to the rotary operation dial, the hook being adapted to be fitted into a lock groove formed inside the body case.

In the invention according to claim 3, the rotary operation dial is made of synthetic resin in an integrated manner.

In the invention according to claim 4, the synthetic resin is acrylonitrile-butadiene-styrene resin.

In the invention according to claim 5, ribs are provided inside the body case to form the lock groove.

In the invention according to claim 6, an inclined portion, across which the hook slides when moving toward the lock groove, is formed in each of the ribs.

In the invention according to claim 7, the ribs are each formed in a strip shape.

In accordance with the arrangement of the invention according to claim 1, the rotary operation dial comprises: the dial body; the rotary operation portion; the lock lever part having the operation lever for operating the locking function and the hook adapted to function as a lock arm; and the connecting part for connecting the lock lever part and the dial body with each other, which are all made of elastic body in an integrated manner, resulting in an extremely simple configuration as well as a substantial reduction in the number of parts, also in an improvement in workability, and further that since lock-release operation can also be performed by operating the rotary operation dial, there is exhibited an effect of improving operationality and user-friendliness.

In accordance with the arrangement of the invention according to claim 2, the rotary operation dial is composed of; the rotary operation portion; and the lock lever part having the operation lever for operating the locking function and the hook adapted to function as a lock arm, which are made of elastic body in an integrated manner, resulting in an extremely simple configuration as well as a substantial reduction in the number of parts, also in an improvement in workability, and further that since lock-release operation can also be performed by operating the rotary operation dial, there is exhibited an effect of improving operationality and user-friendliness.

In accordance with the arrangement of the invention according to claim 3, since it is only required that the rotary operation dial is made of synthetic resin in an integrated manner using a die, there is exhibited an effect of improving workability.

In accordance with the arrangement of the invention according to claim 4, it is advantageous that the rotary operation dial is made of acrylonitrile-butadiene-styrene resin in an integrated manner, resulting in high elasticity and high durability, so as to be able to stand long-term use.

In accordance with the arrangement of the invention according to claim 5, it is advantageous that the lock groove can be formed only by providing the ribs inside the body case without using a special member.

In accordance with the arrangement of the invention according to claim 6, it is advantageous that the inclined portion, across which the hook slides when moving toward the lock groove, is formed in each of the ribs, which allows lock operation to be performed smoothly.

In accordance with the arrangement of the invention according to claim 7, it is advantageous that the ribs are each formed in a strip shape, which allows the body case to be reinforced simultaneously.

DESCRIPTION OF THE PREFERRED EMBODIMENTS

In a camera comprising: a rotary operation dial to be operated rotationally; a locking function for locking the rotary operation dial relative to a predetermined position; and a body case to be fitted with the rotary operation dial, the rotary operation dial comprises: a dial body; a rotary operation portion positioned on the periphery of the dial body; a lock lever part formed by notching circumferential part of the dial body, the lock lever part including part of the rotary operation portion; and a connecting part for connecting the lock lever part and the dial body with each other, the rotary operation dial being made of acrylonitrile-butadiene-styrene resin in an integrated manner, and an operation lever and a hook are formed in the lock lever part in such a manner as to lie, respectively, outside and inside of the body case, the hook being adapted to be fitted into a lock groove formed inside the body case, and also to be moved in a direction opposite to the operation lever around the connecting part in accordance with an operation of the operation lever.

Figure 1:
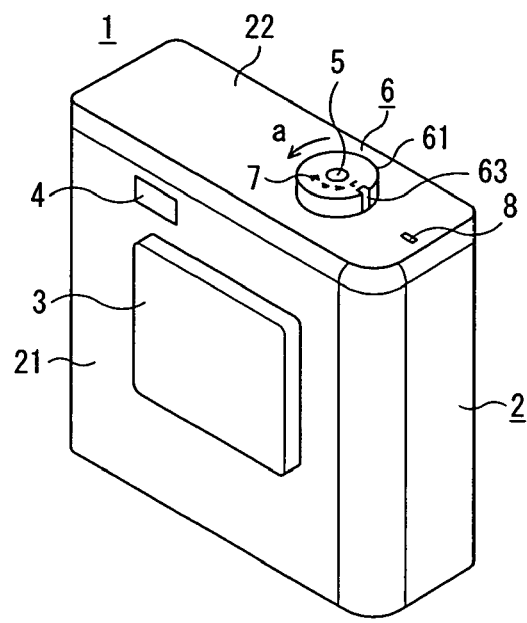
FIG. 1 is a perspective view showing a schematic configuration of a camera having a locking function according to an embodiment of the present invention.
Figure 2:
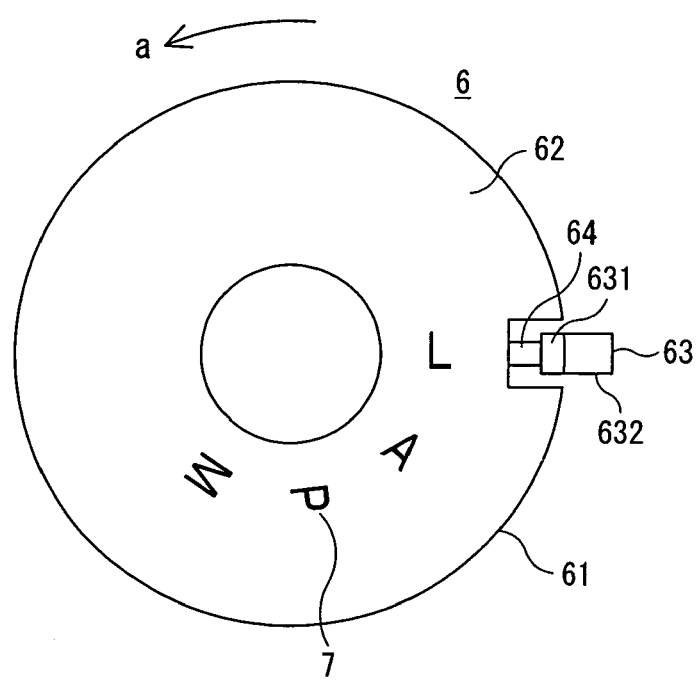
FIG. 2 is a front view showing an example of a rotary operation dial to be used in the camera according to the embodiment of the invention shown in FIG. 1.
Figure 3:
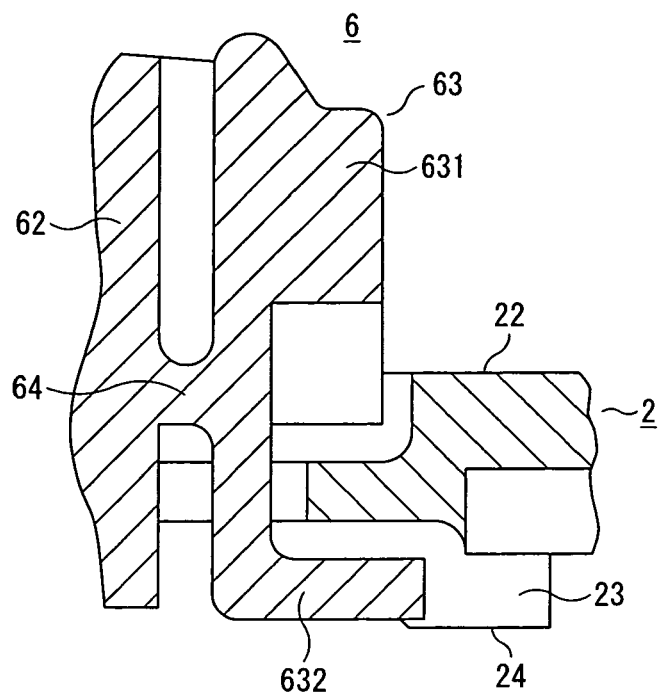
FIG. 3 is a partial cross-sectional view of a substantial part of the camera according to the embodiment of the present invention shown in FIG. 1, showing a locked state.
Figure 4:
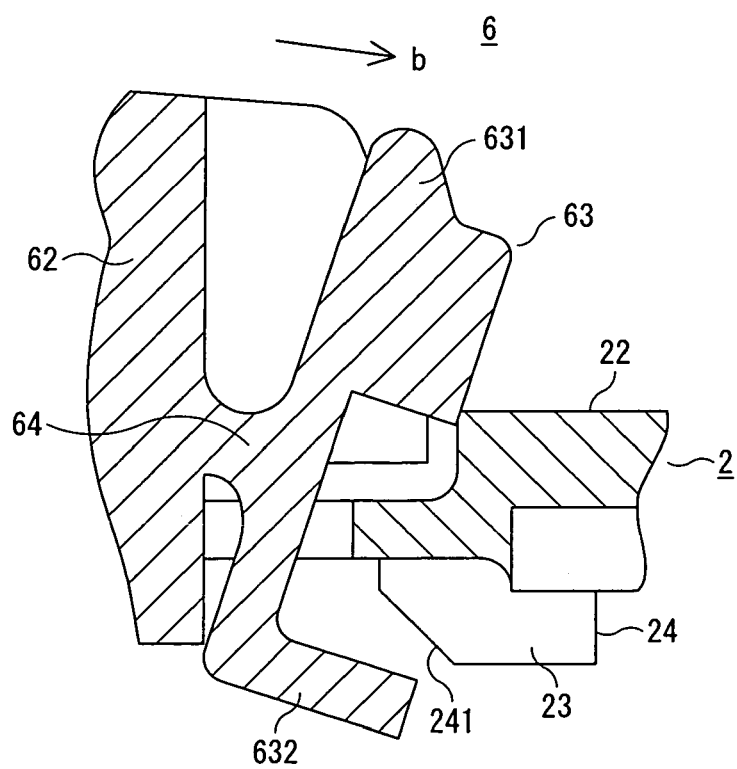
FIG. 4 is also a partial cross-sectional view of the substantial part of the camera according to the embodiment of the present invention shown in FIG. 1, showing an unlocked state.
Figure 5:
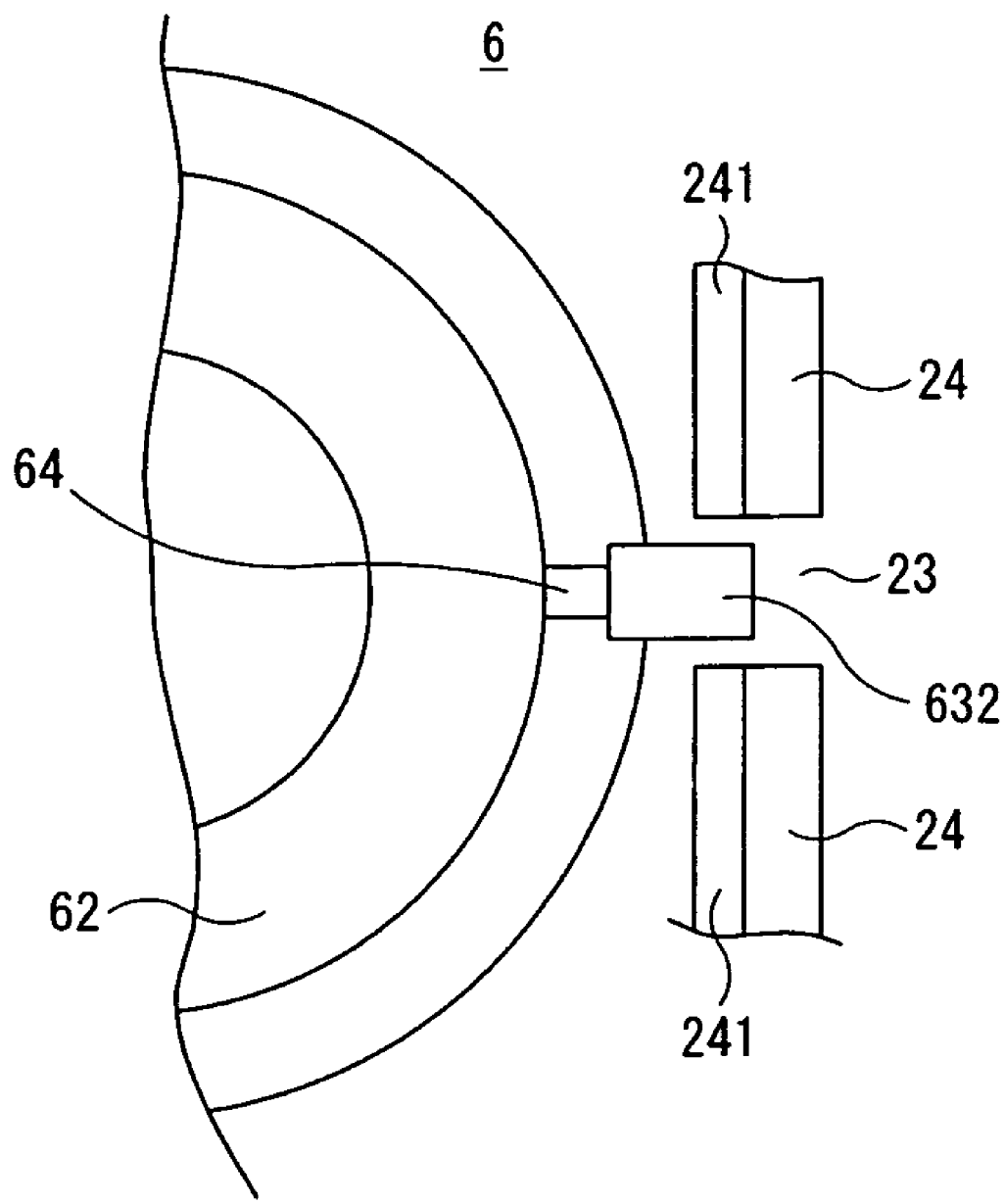
FIG. 5 is a schematic view showing the relationship between a lock groove formed inside of the upper face of the body case and a hook in a lock lever part of the rotary operation dial in the camera according to the embodiment of the present invention shown in FIG. 1.

An embodiment of the present invention will hereinafter be described with reference to FIGS. 1 to 5. FIG. 1 is a perspective view showing a schematic configuration of a camera having a locking function according to the embodiment of the present invention; FIG. 2 is a front view showing an example of a rotary operation dial to be used in the camera according to the embodiment of the invention shown in FIG. 1; FIGS. 3 and 4 are partial cross-sectional views of a substantial part of the camera according to the embodiment of the present invention shown in FIG. 1, where FIG. 3 shows a locked state, while FIG. 4 an unlocked state; and FIG. 5 is a schematic view showing the relationship between a lock groove formed inside of the upper face of the body case and a hook in a lock lever part of the rotary operation dial in the camera according to the embodiment of the present invention shown in FIG. 1.

In the back face 21 of the body case 2 of the camera 1 shown in FIG. 1 are arranged, for example, a liquid crystal display section 3, and a finder window 4. In the upper face 22 of the body case 2 are arranged, for example, a shutter button 5, a rotary operation dial 6 to be operated rotationally when, for example, performing mode setting, and an indicator section 8 for indicating one of signs 7 displayed on the upper face of the rotary operation dial 6. A settable mode such as switch-on, switch-off "L", or program mode "P" is displayed as one of the signs 7. Therefore, rotating a rotary operation portion 61 of the rotary operation dial 6 and thereby setting the indicator section 8 to a desired one among the signs 7 makes an electrical connection, though not shown in the figure, to carry the sign to the control section of the camera body for mode setting. In the front face are also arranged a photographing lens and an electronic flash not shown in the figure.

Then, in accordance with the present invention, the rotary operation dial 6 to be operated rotationally comprises: a dial body 62; a rotary operation portion 61 positioned on the periphery of the dial body 62; a lock lever part 63 formed by notching circumferential part of the dial body 62, the lock lever part including part of the rotary operation portion 61; and a connecting part 64 for connecting the lock lever part 63 and the dial body 62 with each other, the rotary operation dial 6 being made of elastic body in an integrated manner. The elastic body may employ synthetic resin such as an acrylonitrile-butadiene-styrene resin so that the rotary operation dial 6 is molded in an integrated manner using a die. The rotary operation dial 6, which is thus made of acrylonitrile-butadiene-styrene resin in an integrated manner, has advantageously high elasticity and high durability so as to be able to stand long-term use.

In the lock lever part 63 are formed an operation lever 631 and a hook 632 in such a manner as to lie, respectively, outside and inside of the body case 2, the hook 632 being adapted to be fitted into a lock groove 23 formed inside the body case 2, and also to be moved in a direction opposite to the operation lever 631 around a connecting part 64 in accordance with an operation of the operation lever 631.

The lock groove 23 is formed in a predetermined position inside the body case 2, that is, where the rotary operation dial 6 is to be locked, and for example is formed between two strip-shaped ribs 24 provided on the ceiling plane inside the body case 2. Thus providing ribs 24 inside the body case 2 advantageously allows the lock groove 23 to be formed in an integrated manner when producing the body case 2 without requiring a special member. Also, it is only required to form the ribs 24 integrally with the body case 2, where in the case of, for example, allowing the body case 2 to be made of synthetic resin, it is advantageously only required to provide a die. In addition, it is advantageous if, for example, an inclined portion 241 is formed in the face of each of the ribs 24 corresponding to the hook 632 so that the hook 632 slides thereacross when moving toward the lock groove 23, which allows lock operation to be performed smoothly. It is further advantageous if the ribs 24 are each formed in a strip shape, which allows the body case 2 to be reinforced simultaneously. It will then be appreciated that the plural lock grooves 23 may be provided if necessary, though one lock groove 23 is exemplified in the figure.

The mode setting in thus arranged camera according to the present embodiment will be described here. For example, when switching the camera 1 from the switch-off "L" state (refer to FIG. 3) to the program mode "P" state for photographing, it is possible to press the operation lever 631 in the lock lever part 63 in the direction of the arrow "b" shown in FIG. 4 while holding the camera 1, and thereby to release the fitting of the hook 632 to the lock groove 23, and then in the released state (refer to FIG. 4), the rotary operation portion 61 can be rotated in the direction of the arrow "a" shown in FIG. 2 to set the indicator section 8 to the sign 7 of program mode "P" to provide a desired setting. Subsequently, when the pressure applied to the operation lever 631 is released, the lock lever part 63 returns in the opposite direction of the arrow "b" shown in FIG. 4 by its own elastic force, and the state is maintained. In this case, it is preferable to form a recessed portion (not shown in the figure), with which the hook 632 is to engage, in a predetermined position inside the body case 2 to perform positioning operations reliably.

In accordance with thus arranged embodiment, the rotary operation dial 6 comprises: the dial body 62; the rotary operation portion 61; the lock lever part 63 having the operation lever 631 for operating the locking function and the hook 632 adapted to function as a lock arm; and the connecting part 64 for connecting the lock lever part 63 and the dial body 62 with each other, which are all made of elastic body in an integrated manner, resulting in an extremely simple configuration as well as a substantial reduction in the number of parts without requiring a conventional lock spring or push button, also in an improvement in workability without requiring conventional assembling work, and further that since lock-release operation can also be performed by operating the rotary operation dial, there is exhibited an effect of improving operationality and user-friendliness.

It is noted that although the above-described embodiment is a preferred embodiment of the present invention, the present invention is not restricted thereto, but may be embodied in other specific forms without departing from the gist thereof.

What is claimed is:

1. A camera comprising: a rotary operation dial to be operated rotationally; a locking function for locking said rotary operation dial relative to a predetermined position; and a body case to be fitted with said rotary operation dial, wherein said rotary operation dial comprises: a dial body; a rotary operation portion positioned on the periphery of said dial body; a lock lever part formed by notching circumferential part of said dial body, said lock lever part including part of said rotary operation portion; and a connecting part for connecting said lock lever part and said dial body with each other, said rotary operation dial being made of elastic body in an integrated manner, and wherein an operation lever and a hook are formed in said lock lever part in such a manner as to lie, respectively, outside and inside of said body case, said hook being adapted to be fitted into a lock groove formed inside said body case, and also to be moved in a direction opposite to said operation lever around said connecting part in accordance with an operation of said operation lever.

2. A camera comprising: a rotary operation dial to be operated rotationally; a locking function for locking said rotary operation dial relative to a predetermined position; and a body case to be fitted with said rotary operation dial, wherein said rotary operation dial is made of elastic body in an integrated manner, said rotary operation dial comprising a lock lever part having an operation lever and a hook which lie, respectively, outside and inside of said body case relative to said rotary operation dial, said hook being adapted to be fitted into a lock groove formed inside said body case.

3. The camera according to claim 1, wherein said rotary operation dial is made of synthetic resin in an integrated manner.

4. The camera according to claim 3, wherein said synthetic resin is acrylonitrile-butadiene-styrene resin.

5. The camera according to claim 1, wherein ribs are provided inside said body case to form said lock groove.

6. The camera according to claim 5, wherein an inclined portion, across which said hook slides when moving toward said lock groove, is formed in each of said ribs.

7. The camera according to claim 5, wherein said ribs are each formed in a strip shape.

* * * * *